Nov. 3, 1959 G. H. OHRT 2,910,715
WINDSHIELD WASHER
Filed Sept. 9, 1954
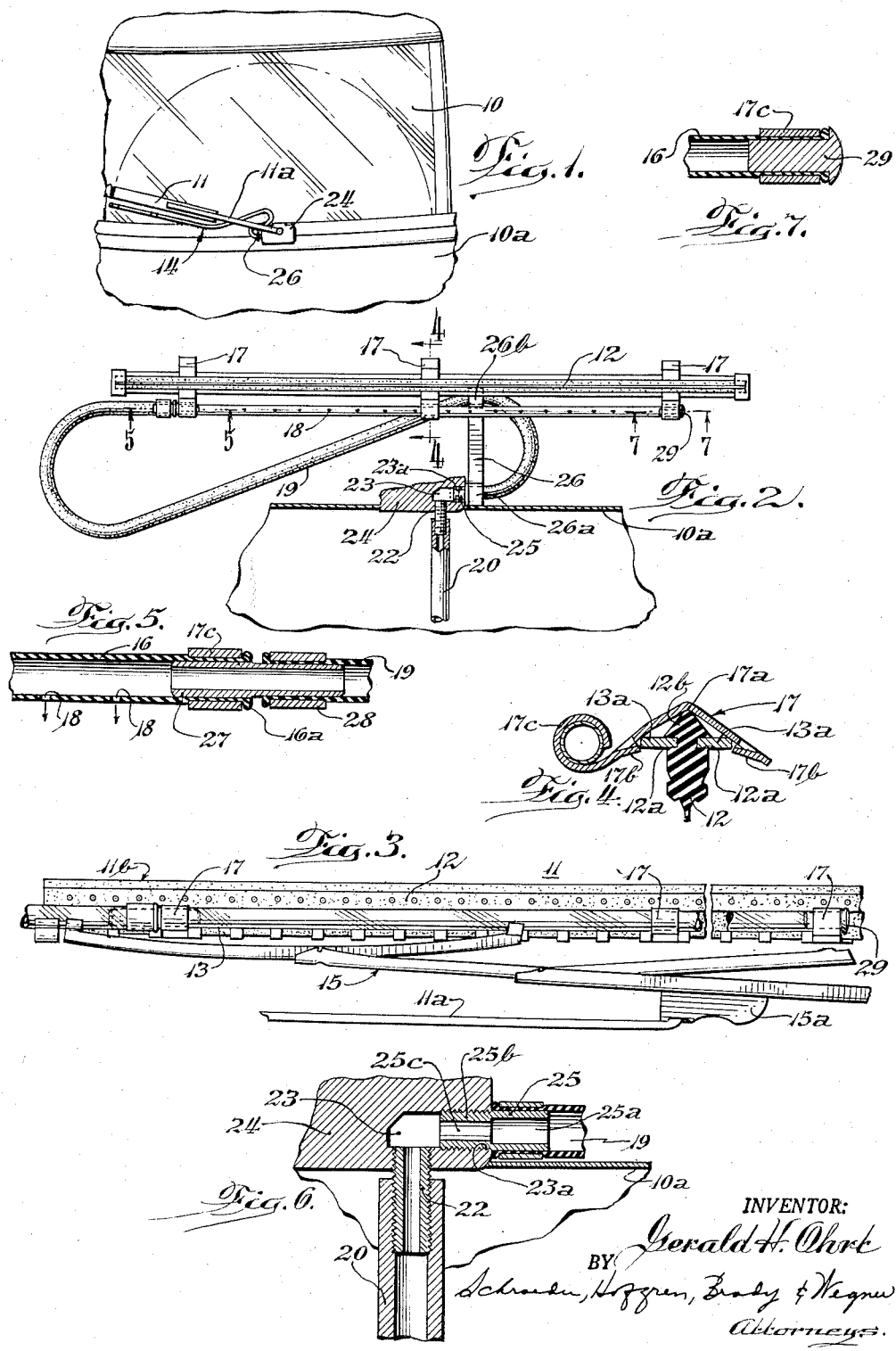
INVENTOR:
Gerald H. Ohrt
BY
Schroeder, Hofgren, Brady & Wegner
Attorneys.

United States Patent Office 2,910,715
Patented Nov. 3, 1959

2,910,715

WINDSHIELD WASHER

Gerald H. Ohrt, Chillicothe, Ill.

Application September 9, 1954, Serial No. 454,929

7 Claims. (Cl. 15—250.4)

This invention is concerned with a windshield washer and more particularly with a windshield washing arrangement by means of which a washing liquid is distributed over substantially all the major viewing area of the windshield.

Windshield washing systems by which a washing solution may be sprayed on a windshield to wash away mud and dirt or to melt ice are well known and in widespread use. In many of the commercial forms of such washing systems a nozzle is provided on the cowl of the windshield adjacent the drive connection for the windshield wiper, while on some others a double opening nozzle is provided on substantially the center line of the automobile hood and sprays the washing solution on both sides of the windshield. Both of these arrangements are generally unsatisfactory when the automobile is traveling at high speeds or in the presence of a strong wind, as the major portion of the washing solution may be blown away and of no help in cleaning the windshield. It has been proposed in the past that a rigid tube be mounted along the windshield wiper to transmit the washing solution directly onto the windshield surface where it is desired. Apparently, such arrangements have never proven satisfactory commercially.

I have devised and disclose and claim herein a novel windshield washing arrangement which may readily be utilized with presently used washing systems and windshield wipers and which distribute the washing solution onto the windshield surface along the length of the wiper blade.

One feature of the invention is the provision in a windshield washing arrangement including a source of washing liquid and an elongated wiper blade of an elongated flexible tube operably connected to the source of liquid and clip means carrying the tube and readily securable to the wiper blade, the tube having a plurality of apertures therein for directing the liquid toward the windshield. Another feature is that at least two mounting clips are provided, one at either end of the blade, frictionally engaged therewith and slideable longitudinally therealong, the clips engaging the tube and holding it under tension along the wiper blade. A further feature is that, in a washing arrangement including a wiper blade having a backing member flexible in a plane at right angles to the surface of the windshield, the tube mounting clips have a portion adapted for engagement with the backing member and another portion for supporting the tube. Still another feature is that spring clips are provided, each having a bowed portion extending over the back of the wiper blade and having means thereon for engaging the sides of the flexor portions of the blade backing strip.

Yet a further feature is the provision in a windshield washing arrangement including a source of washing liquid having a tubular outlet fitting and a wiper blade including means for spraying liquid on the windshield of an elongated flexible tube connected to the fitting and to the spraying means and a spacer member having a first end portion secured to the tube and holding it on the fitting and another end portion connected to the tube at an intermediate point thereon holding the tube in a desired position.

And another feature is the provision of a fitting comprising the tubular member having a bore and having an externally threaded portion at one end thereof, the interior of the bore adjacent the threaded portion having a tool receiving configuration.

Further features and advantages will readily be apparent from the following specification and from the drawings, in which:

Figure 1 is a fragmentary view of an automobile windshield showing a windshield wiper provided with a washing arrangement according to the invention;

Figure 2 is a view of the wiper and washing arrangement taken looking out through the automobile windshield, with a portion broken away and with the wiper blade displaced from its actual operating position;

Figure 3 is a fragmentary side elevation of the wiper and washer;

Figure 4 is a section taken along line 4—4 of Figure 2;

Figure 5 is an enlarged fragmentary section taken along line 5—5 of Figure 2;

Figure 6 is an enlarged longitudinal section through the tubular fitting; and

Figure 7 is an enlarged fragmentary section taken along line 7—7 of Figure 2.

The details of the windshield wiper driving means and the actuating arrangement for the washing system will not be shown or described in detail herein. There are many such systems known and in use and the present invention may readily be adapted for use with any of them.

Referring now to Figure 1, a portion 10 of an automobile windshield is shown with an elongated wiper 11 mounted on an oscillatable wiper arm 11a which is connected to a drive fitting extending through the automobile cowl 10a.

The washing arrangement indicated generally as 14 is best seen in Figures 2 and 3. The wiper blade 11b shown herein is a commercial design of the flexible type adapted for use with curved windshields and includes a wiper element 12 which is provided with a backing strip 13 having flexor portions 13a disposed in opposed longitudinal slots 12a extending along the sides of the wiper 12. The stacked yoke mounting 15 permits flexing of the blade 12 and backing strip 13 in a plane generally at right angles to the surface of the windshield, the blade thus conforming with the curvature of the windshield surface. A fitting 15a on the yoke structure provides for the connection of the blade 11 to the oscillatable wiper arm 11a.

In accordance with the invention an elongated flexible tube 16 is mounted alongside the wiper blade 11 and in the plane of flexing of the backing strip 13 by means of a plurality of "snap-on" spring clips 17. The tube 16 is provided with apertures 18 through which the washing liquid may be distributed on the windshield surface along the length of the wiper blade. The washing liquid is supplied to the tube 16 by means of a second flexible tube 19 connected to a source of washing liquid 20.

The thin walled flexible tube 16 is preferably of a resilient plastic material such as vinyl and is provided at either end with outturned bead portions 16a. These beads 16a may be formed by heating momentarily the end of the tube whereupon the plastic material flows back forming the bead.

The spring clips 17, Figure 4, each have a resilient bowed portion 17a whch extends over the back 12b of the wiper element 12 and is provided with a pair of inwardly struck ears 17b which engage the sides of flexor portions 13a of the backing strip. A second portion 17c of the clips is curled to engage and support elongated tube 16. Clips 17 are preferably made of aluminum or a similar non-corroding resilient material and may readily be snapped over the backing strip 13 of the wiper blade.

Clips 17 are slideable longitudinally along the backing member 13 and the looped portion 17c of the two end clips engage beads 16a of tube 16 so that the tube may be mounted alongside the wiper blade under a small amount of tension, preventing it from flopping around and insuring that it will not foul the wiper blade.

The source of washing liquid 20 is coupled through the cowl 10a of the automobile by a suitable connector fitting 22 which extends into a chamber 23 in wiper arm bearing housing 24. In some present systems the threaded outlet 23a of chamber 23 receives a nozzle which sprays the washing liquid toward the windshield. Such a nozzle may be removed and replaced by a tubular fitting 25 over which one end of flexible connector tube 19 is slipped. With some washing systems, however, a special connector may be necessary.

A spacer member 26 is provided which has a first looped end portion 26a which engages tube 19 and secures it tightly on fitting 25. The other end of the spacer member 26 is provided with a similar loop 26b which engages an intermediate portion of the tube 19, holding the free portion of tube 19 down out of the major area of vision of the driver of the automobile (see Figures 1 and 2) and preventing excessive strain on the connection between the tube and fitting 25.

A sleeve 27 joins the end of the tube 19 with one end of the tube 16 and a collar 28 is placed therearound to secure the tube and sleeve together. The opposite end of tube 16 is provided with a removable closure plug 29 which seals the end of the tube during operation but which may be removed for cleaning purposes. Beads 16a at the ends of tube 16 prevent the tube from pulling out of clips 17 when either sleeve 27 or plug 29 are removed.

The fitting 25 is provided with a fluid conducting bore 25a extending therethrough and has a threaded end portion 25b which engages the threaded outlet opening 23a from chamber 23. The interior of the bore adjacent the threaded portion is reduced in size and formed with a tool receiving configuration as shown at 25c. Fitting 25 may be started into threaded opening 23a with the fingers and then a tool, such as a hexagonal wrench, inserted thereinto, in engagement with the portion 25c. The fitting 25 may then be tightened in place. The construction of the fitting 25 is particularly advantageous since it may be made of relatively thin wall stock, yet the tool will not deform it as the tool engaging portion is restrained by the body of housing 24.

The thin wall plastic tube used in the washing arrangement and the various metal fittings of aluminum are all quite light so that only a small amount of weight is added to the wiper structure. As a result the operation of the wiper is in no way impaired.

While I have shown and described certain embodiments of my invention, it is to be understood that it is capable of many modifications. Changes therefore in the construction and arrangement may be made without departing from the spirit and scope of the invention as disclosed in the appended claims.

I claim:

1. In a windshield washing arrangement including a source of washing liquid and an elongated wiper blade having a backing member flexible in a plane at right angles to the surface of the windshield, means of the character described, comprising: an elongated flexible tube operably connected to said source of liquid; and a plurality of clips each having a portion adapted for snap-on engagement with said backing member and another portion for supporting said tube, said tube having a plurality of apertures therein for directing said liquid toward said windshield.

2. In a windshield washing arrangement including a source of washing liquid and an elongated flexible wiper blade having a backing strip with flexor portions on either side of said blade and flexible in a plane at right angles to the surface of the windshield, means of the character described, comprising: an elongated flexible tube operably connected to said source of liquid; and a plurality of spring clips each having a bowed portion extending over the back of said blade and having means thereon for engaging the sides of the flexor portions of said backing strip, and each having another portion for supporting said tube, said tube having a plurality of apertures therein for directing said liquid toward said windshield.

3. An arrangement of the character described in claim 2, wherein the means on the bowed portion of said spring clips comprise ears struck inwardly therefrom.

4. In a windshield washing arrangement including a source of washing liquid and an elongated flexible wiper blade having a backing strip with flexor portions on either side of said blade and flexible in a plane at right angles to the surface of the windshield, means of the character described, comprising: an elongated flexible tube operably connected to said source of liquid; and at least two spring clips one at either end of said wiper blade and each having a bowed portion extending over the back of said blade and having means thereon for frictionally engaging the sides of the flexor portions of said backing strip, said clips being slideable longitudinally therealong, said clips having another portion engaging said tube and holding it along said wiper blade under tension and in the plane of flexure of the backing strip, said tube having a plurality of apertures therein for directing said liquid toward a windshield.

5. In a windshield washing arrangement including a source of washing liquid having a tubular outlet fitting adjacent the windshield and an oscillatable wiper blade including means for spraying liquid on said windshield, means of the character described for conducting liquid from said fitting to said spraying means, comprising: an elongated flexible tube connected to said fitting and to said spraying means; and a spacer member having a first end portion secured to said tube and holding it on said fitting and another end portion connected to said tube at an intermediate point thereon, holding said tube in a desired position.

6. In a windshield washing arrangement including a source of washing liquid having a tubular outlet fitting adjacent the windshield and an oscillatable wiper blade including means for spraying liquid on said windshield, means of the character described for conducting liquid from said fitting to said spraying means, comprising: an elongated flexible tube having one end slipped over said fitting; and an elongated spacer member having loops formed at either end thereof, one loop passing around the end of said tube to hold the tube on said fitting and the loop at the other end of said member gripping an intermediate portion of said tube to hold said tube in a desired position out of the major area of vision through the windshield.

7. In a windshield washing arrangement, a wiper unit comprising an elongated wiper blade having a backing member, said blade and backing member being flexible in a plane at right angles to the surface of the windshield, means of the character described, comprising: an elongated flexible tube adapted to be connected to a source of liquid; and a plurality of clips at longitudinally spaced points on said tube attaching the latter to said wiper unit in a substantially parallel juxtaposed relation, said tube having a plurality of apertures therein for directing said liquid toward said windshield.

(References on following page)

References Cited in the file of this patent

UNITED STATES PATENTS

| | | |
|---|---|---|
| 1,647,319 | Shults | Nov. 1, 1927 |
| 1,655,266 | Gustafson | Jan. 3, 1928 |
| 1,656,473 | Darlington | Jan. 17, 1928 |
| 1,919,236 | Lunsford | July 25, 1933 |
| 2,147,593 | Bracken | Feb. 14, 1939 |
| 2,196,551 | Fischer | Apr. 9, 1940 |
| 2,416,572 | Cordova | Feb. 25, 1947 |
| 2,596,063 | Anderson | May 6, 1952 |